United States Patent [19]

Jenkins

[11] Patent Number: 5,033,636

[45] Date of Patent: Jul. 23, 1991

[54] REFRIGERATOR CABINET LINER HAVING NON-CRINKLED CORNERS

[75] Inventor: Thomas E. Jenkins, Louisville, Ky.

[73] Assignee: General Electric Company, Louisville, Ky.

[21] Appl. No.: 642,564

[22] Filed: Jan. 18, 1991

Related U.S. Application Data

[60] Continuation of Ser. No. 475,208, Feb. 5, 1990, abandoned, which is a division of Ser. No. 254,732, Oct. 7, 1988, Pat. No. 4,917,841.

[51] Int. Cl.[5] .......................................... B65D 25/18
[52] U.S. Cl. ................................ 220/430; 220/444; 220/467; 220/470; 220/DIG. 18
[58] Field of Search ............... 220/421, 422, 461, 470, 220/608, 609

[56] References Cited

U.S. PATENT DOCUMENTS

| | | | |
|---|---|---|---|
| 1,832,919 | 11/1931 | Taylor | 220/431 |
| 2,394,229 | 2/1946 | Bergstrom | 220/431 |
| 3,122,598 | 2/1964 | Berger | 264/247 |
| 3,440,308 | 4/1969 | Carbary et al. | 264/45 |
| 3,666,132 | 5/1972 | Yamamoto et al. | 220/444 |
| 3,904,068 | 9/1975 | Beaujean | 220/444 |
| 3,911,190 | 10/1975 | Myers et al. | 428/315 |
| 3,912,107 | 10/1975 | Baumann | 220/444 |
| 3,927,788 | 12/1975 | Zinniger et al. | 220/444 |
| 3,944,111 | 3/1976 | Nonomaque et al. | 220/444 |
| 3,948,407 | 4/1976 | Puterbaugh | 220/430 |
| 4,114,065 | 9/1978 | Horvay | 220/444 |
| 4,114,213 | 9/1978 | Beernaerts | 5/345 R |
| 4,432,285 | 2/1984 | Boyars et al. | 220/444 |
| 4,496,072 | 1/1985 | Fleck | 220/432 |
| 4,535,574 | 8/1985 | Dettelbach et al. | 51/204 |
| 4,676,938 | 6/1987 | Karklin et al. | 264/46.5 |
| 4,698,196 | 10/1987 | Fabian | 264/565 |
| 4,707,401 | 11/1987 | Benford | 220/444 |
| 4,771,532 | 9/1988 | Taylor, Jr. et al. | 29/455.1 |
| 4,907,569 | 3/1990 | Lemense | 220/444 |
| 4,917,841 | 4/1990 | Jenkins | 264/46.8 |

Primary Examiner—Stephen Marcus
Assistant Examiner—S. Castellano
Attorney, Agent, or Firm—Radford M. Reams; H. Neil Houser

[57] ABSTRACT

A refrigerator liner of a vacuum formed plastic with a thickness of about 0.007" to 0.050" has each corner formed without crinkling when thermal insulation material is foamed against the outer surface of the liner. The non-crinkling of each corner of the refrigerator liner is accomplished through forming each of the corners with a flat surface having its periphery as a circle during vacuum forming of the refrigerator liner rather than with a spherical radius. This enables the flat surface to be placed in tension when moved against a corresponding flat surface of a foam plug by the pressure produced during foaming of the foamed thermal insulation material. This results in each corner having a central portion with a convex cross section and an outer portion surrounding the central portion and concave in cross section whereby it does not appear to be crinkled.

5 Claims, 3 Drawing Sheets

REFRIGERATOR CABINET LINER HAVING NON-CRINKLED CORNERS

This is a continuation of application Ser. No. 07/475,208, filed Feb. 5, 1990, now abandoned, which in turn is a division of application Ser. No. 07/254,732, filed Oct. 7, 1988, now U.S. Pat. No. 4,917,841.

FIELD OF THE INVENTION

This invention relates to a very thin vacuum formed structure of plastic having non-crinkled corners.

BACKGROUND OF THE INVENTION

When forming a refrigerator cabinet with a foamed thermal insulation material such as urethane between the inner liner and the outer casing, the foam is introduced as a liquid into the space between the liner and the casing and foams into place by adhering to both the outer surface of the liner and the inner surface of the casing. During this formation of the refrigerator cabinet, a foam plug is disposed within the liner in spaced relation thereto to have a predetermined clearance therebetween. This predetermined clearance is necessary because of tolerance variations of the vacuum formed inner liner.

During foaming of urethane, a pressure of about 3-5 p.s.i. is exerted against the outer surface of the liner. As the thickness of the liner decreases, the pressure exerted during foaming causes movement of the inner surface of the liner against the foam plug. Since the liner is vacuum formed, its corners previously have been produced on a spherical radius. As the thickness of the liner decreases, the slight pressure created by foaming of the thermal insulation material can cause deformation of the liner so that it is pushed against the foam plug. As the pressure increases, increase thicknesses of the liner can be pushed against the foam plug.

When the liner has its inner surface pushed by the foaming pressure against the foam plug, there will be buckling of each corner of the inner liner having a spherical radius. This occurs because a portion of the liner at each corner with the spherical radius is placed in compression when moved against a corresponding surface of the foam plug. This compression of each corner of the liner seeks to increase the total distance of the corner, and this is not possible so that the corner buckles. This produces a crinkling effect, which is aesthetically undesirable.

SUMMARY OF THE INVENTION

The present invention avoids crinkling of each corner of the liner of a refrigerator cabinet by forming each corner of the liner flat, rather than on a spherical radius, during vacuum formation of the liner. When the pressure created by foaming of the thermal insulation material acts against the outer surface of the liner, the flat surface of each corner of the liner abuts a corresponding flat surface on the foam plug. This places the flat surface in tension to shorten it. As a result, each corner of the liner has a central circular portion of convex shape in cross section and an outer surrounding portion of concave shape in cross section. When viewed from the interior of the liner as a user would do, the corners do not have a crinkled appearance but appear straight or flat.

An object of this invention is to form a very thin liner of a refrigerator cabinet with non-crinkled corners.

Another object of this invention is to form each corner of a vacuum formed structure that is very thin without crinkles.

Other objects of this invention will be perceived from the following description, claims, and drawings.

BRIEF DESCRIPTION OF THE DRAWINGS

The attached drawings illustrate a preferred embodiment of the invention, in which.

DESCRIPTION OF THE PREFERRED EMBODIMENT

Figure 1:
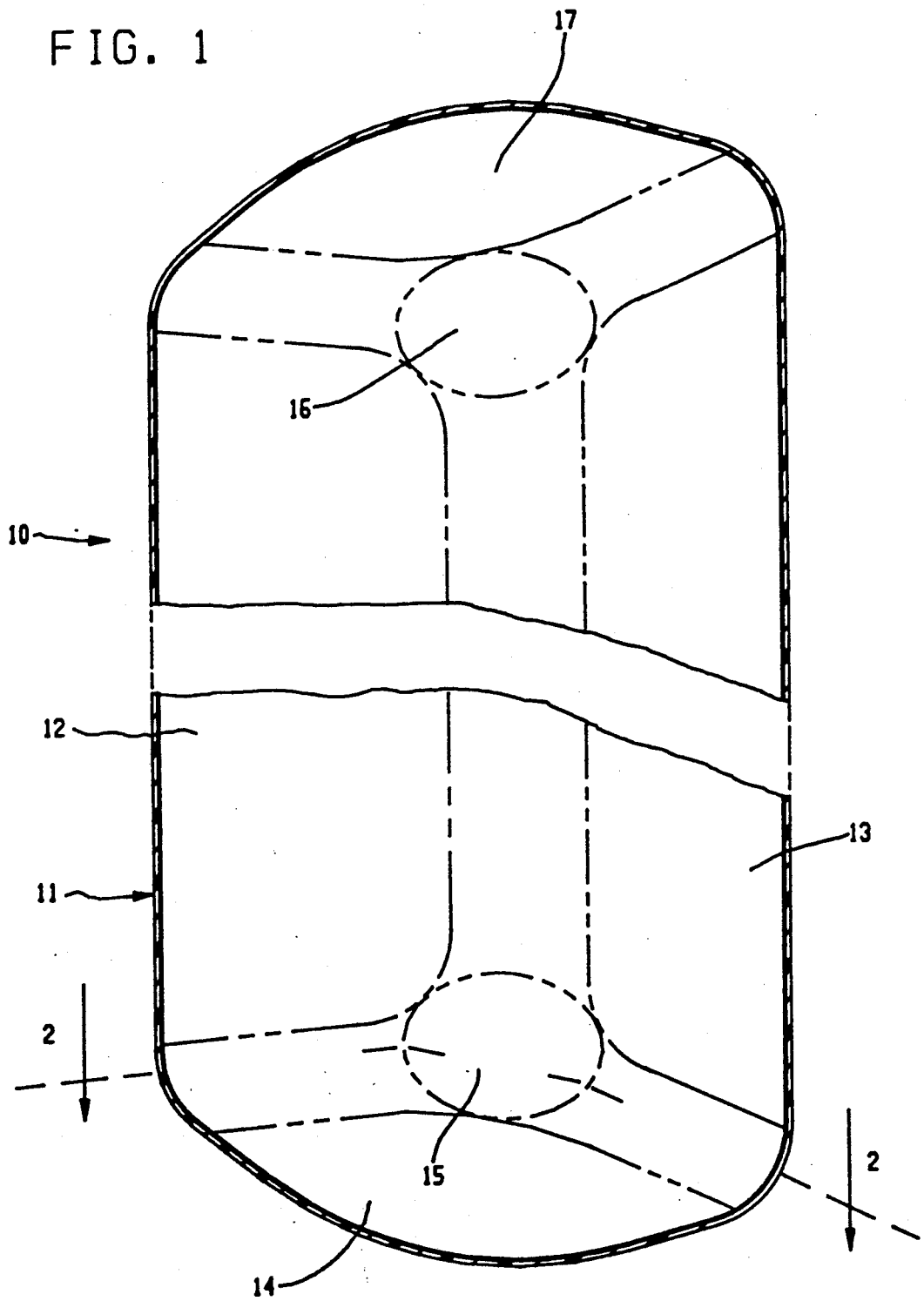
FIG. 1 is a fragmentary perspective view of a portion of an upper corner and a lower corner of a refrigerator cabinet liner having each corner formed in accordance with the present invention.
Figure 2:
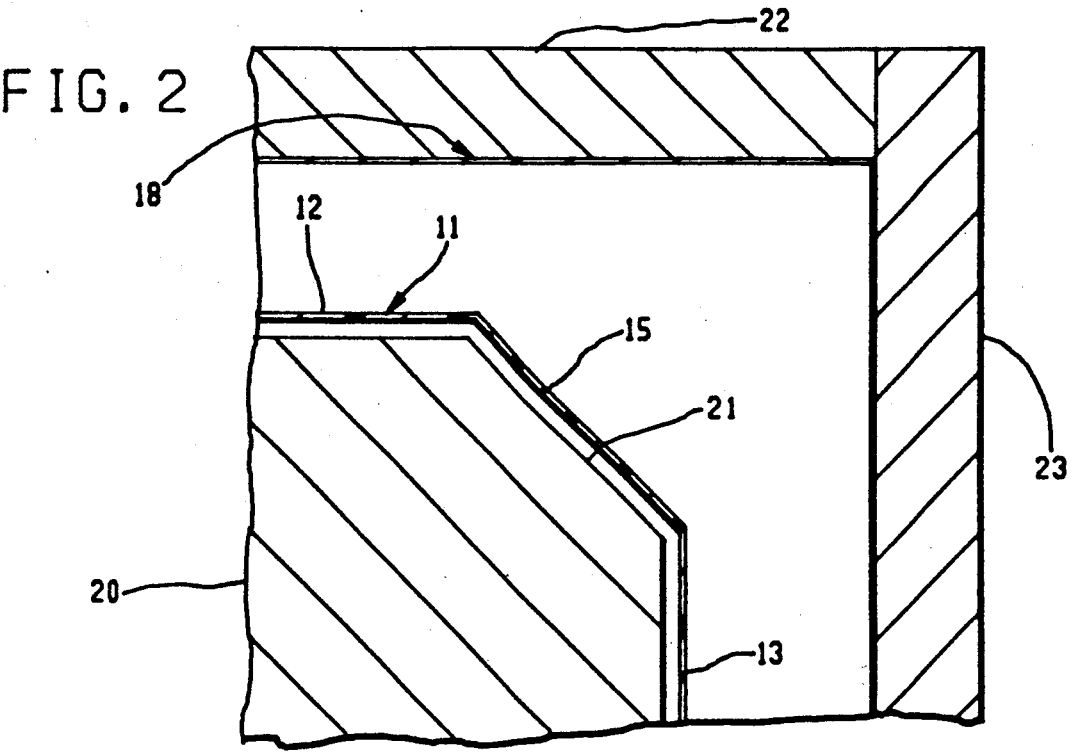
FIG. 2 is a fragmentary sectional view of a portion of the liner of FIG. 1 taken along line 2—2 of FIG. 1 and an outer casing and showing the liner disposed in spaced relation to a foam plug and the outer casing prior to foaming of the foamed thermal insulation material.

Referring to the drawings and particularly FIG. 1, there is shown a refrigerator cabinet 10 including a liner 11 of a vacuum formed plastic. The liner 11 includes a rear wall 12, a side wall 13, and a bottom wall 14. The walls 12, 13, and 14 intersect to form a bottom corner 15 having a flat surface, as shown in FIG. 2, with the flat surface being formed with its periphery as a circle during vacuum forming of the liner 11.

The liner 11 (see FIG. 1) also has a top corner 16 formed at the intersection of the rear wall 12 and the side wall 13 with a top wall 17. The liner 11 also has a bottom corner (not shown) formed by the other side wall (not shown), the rear wall 12, and the bottom wall 14 and a top corner (not shown) formed by the other side wall, the rear wall 12, and the top wall 17.

Figure 3:
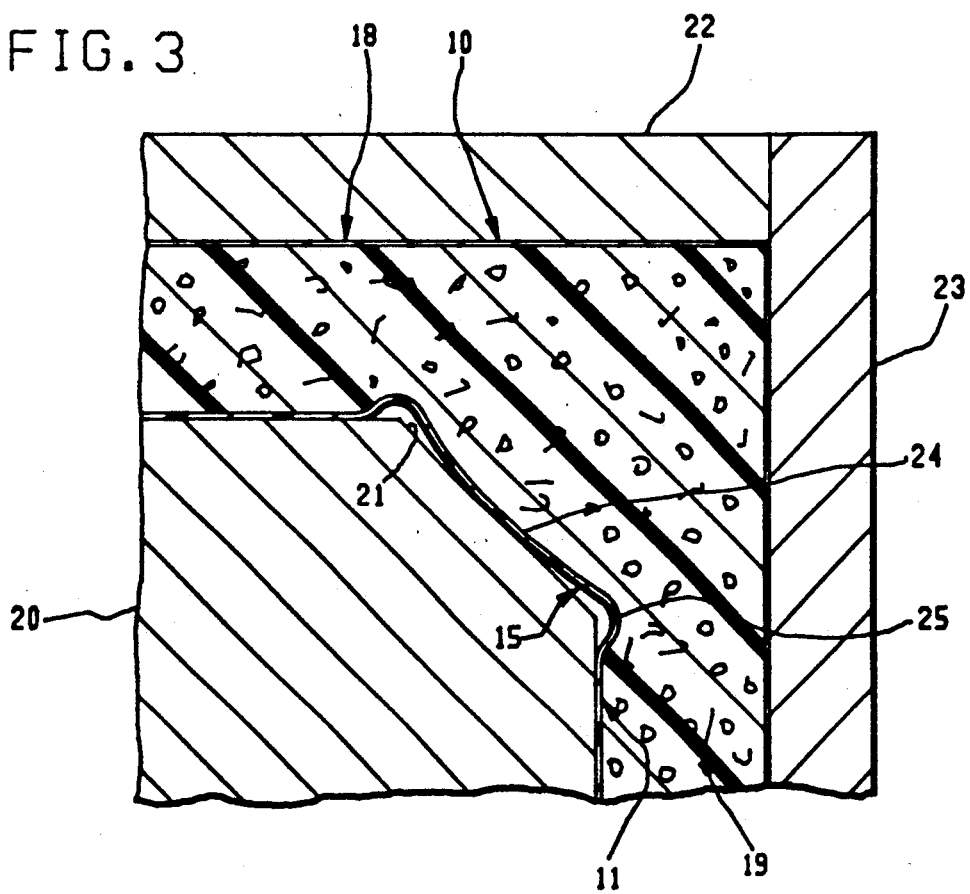
FIG. 3 is a fragmentary sectional view showing the formation of the corner of the liner of FIG. 2 after foaming of the foamed thermal insulation material is completed.

As shown in FIG. 3, the refrigerator cabinet 10 includes an outer casing 18 and foamed thermal insulation material 19 between the outer casing 18 and the liner 11. When the foamed thermal insulation material 19 is to be foamed in place between the liner 11 and the outer casing 18, a foam plug 20 (see FIG. 2) of metal is positioned within the inner liner 11, which is open at the front.

The foam plug 20 has a flat surface 21, which has its periphery as a circle, formed on the same angle as the angle of the bottom corner 15. Thus, the flat surface 21 of the foam plug 20 is substantially parallel to the flat surface of the bottom corner 15 prior to the thermal insulation material 19 (see FIG. 3) being foamed in place.

When the foamed thermal insulation material 19 is to be foamed in place and adhered to both the outer surface of the liner 11 and the inner surface of the outer casing 18, the outer casing 18 (see FIG. 2) is positioned at a desired spacing from the liner 11 and retained in position by plates 22 and 23. With the plates 22 and 23 so positioned, a liquid foam material such as urethane, for example, is introduced into the space between the outer surface of the liner 11 and the inner surface of the outer casing 18.

As foaming occurs to convert the liquid foam material into the foamed thermal insulation material 19 (see FIG. 3), a pressure of 3-5 p.s.i. is created on the outer surface of the liner 11. This causes all of the surfaces of the liner 11 to move towards the corresponding surfaces of the foam plug 20. As a result, the bottom corner 15 is placed in tension so that a central circular portion 24 of the bottom corner 15 is moved against the flat surface 21 of the foam plug 20 to form the central portion 24 of the corner 15 with a slight convex shape in cross section as viewed in FIG. 3. This also produces an outer portion 25 of the bottom corner 15 surrounding the central portion 24 with the outer portion 25 having a concave shape in cross section as shown in FIG. 3. The outer portion 25 has its periphery formed as a circle.

This resulting shape of the bottom corner 15 does not produce any crinkling of the bottom corner 15. Thus, an aesthetic appearance of the bottom corner 15 is produced. Likewise, the top corner 16 (see FIG. 1) of the liner 11 and the other two corners (not shown) of the liner 11 are similarly formed.

Figure 4:
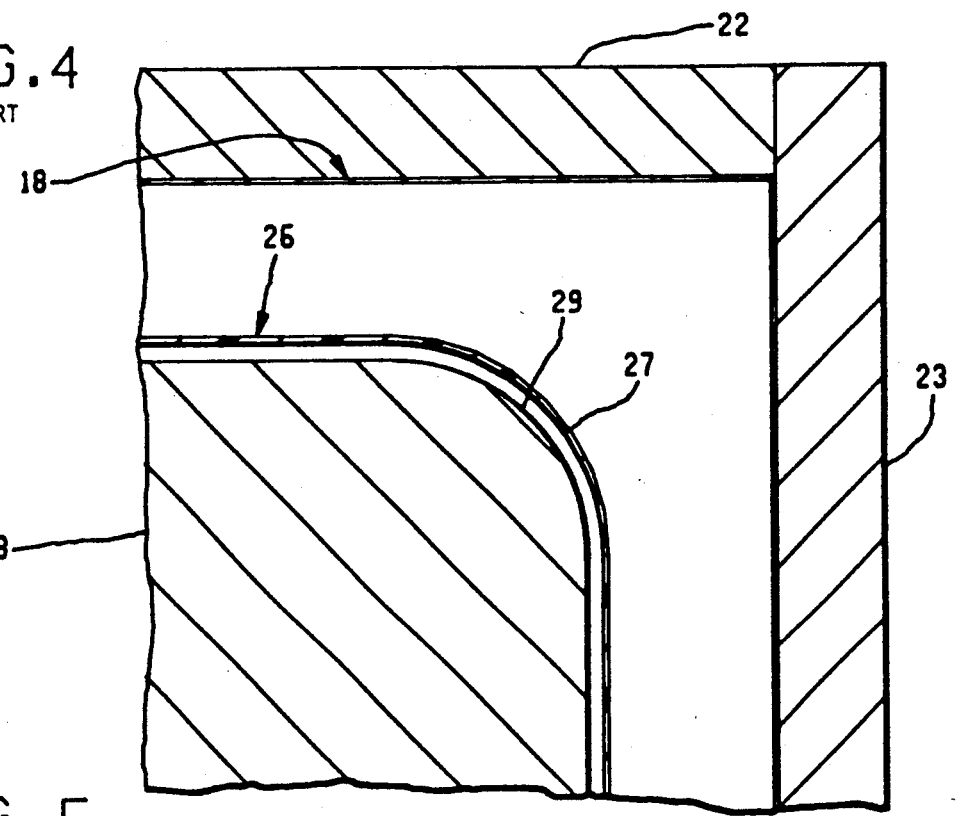
FIG. 4 is a fragmentary sectional view of a corner of a refrigerator cabinet liner having a spherical radius and an outer casing and showing the liner disposed in spaced relation to a foam plug and the outer casing prior to foaming of the foamed thermal insulation material.

Referring to FIG. 4, there is shown a refrigerator cabinet liner 26, which is vacuum formed, with a bottom corner 27 having a spherical radius. A foam plug 28 has a similar spherical surface 29 for cooperating with the spherical radius of the bottom corner 27 when the foamed thermal insulation material 19 (see FIG. 5) is foamed in place between the liner 26 and the outer casing 18. The outer casing 18 has the plates 22 and 23 cooperating therewith in the same manner as discussed with respect to FIGS. 2 and 3.

Figure 5:
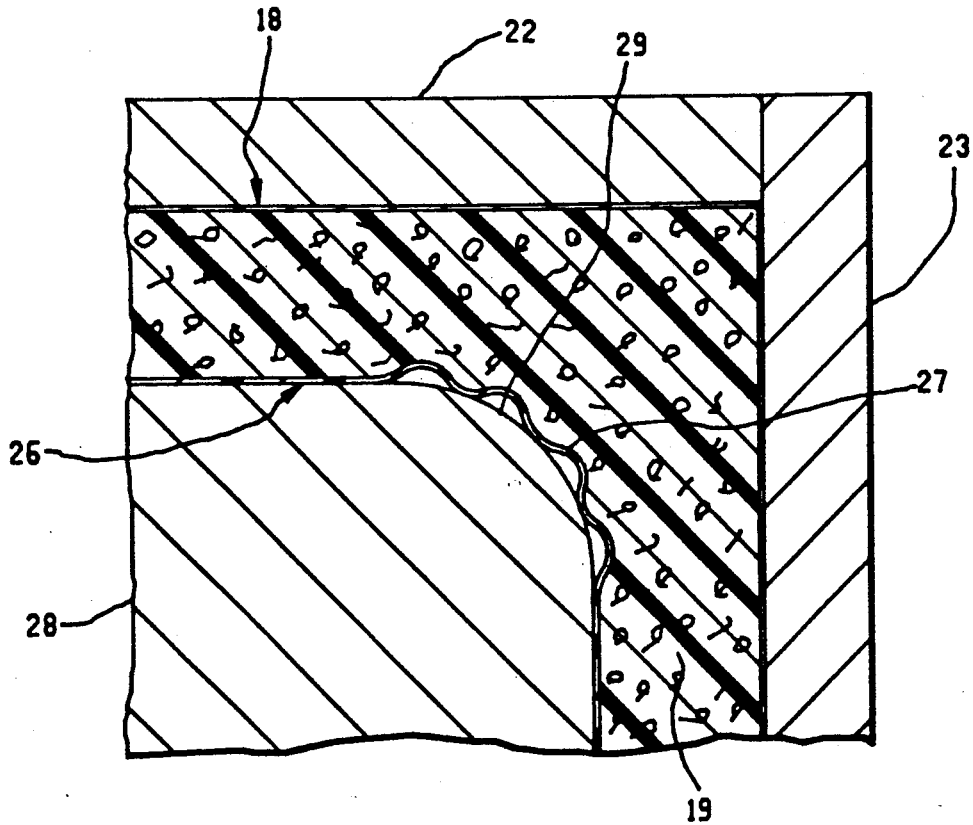
FIG. 5 is a fragmentary sectional view showing formation of the corner of the liner of FIG. 4 after foaming of the foamed thermal insulation material is completed with the corner being crinkled.

With the foam plug 28 (see FIG. 4) having the spherical surface 29 and the bottom corner 27 having a spherical radius, the introduction of the liquid foam material into the space between the liner 26 and the outer casing 18 so that foaming occurs with a pressure of 3-5 p.s.i. results in the bottom corner 27 of the liner 26 buckling as shown in FIG. 5. This creates the undesirable crinkles. This buckling of the bottom corner 27 of the liner 26 is created by compression of the bottom corner 27 as the foaming pressure of the foamed thermal insulation material 19 causes movement of the liner 26 against the foam plug 28.

With the foaming pressure of the urethane being about 3-5 p.s.i., the refrigerator cabinet liner 26 or other structure having corners formed with a spherical radius will be crinkled at each corner when the range of the thickness of the liner varies from about 0.007" to 0.050". The maximum thickness of the liner 11 (see FIG. 1) at which this invention is used is that at which the liner 11 will not crinkle. Thus, if the foaming pressure increases beyond 3-5 p.s.i., then a greater thickness of the liner 11 than 0.050" would require this invention to avoid a crinkled corner.

An advantage of this invention is that it prevents crinkling at each corner of a vacuum formed structure such as a refrigerator cabinet liner, for example, of a relatively thin material. Another advantage of this invention is that it enables a relatively thin liner of a refrigerator cabinet to have an aesthetic appearance at each corner.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A refrigerator cabinet including a relatively thin liner of vacuum formed plastic material having a thickness no greater than about 0.050 inch; a casing disposed in spaced relationship to and surrounding said liner; and foamed-in-place thermal insulation material substantially completely filling the space between said liner and said casing and formed by foaming of a liquid foam supplied between said liner and said casing, said insulation material adhering to said liner and casing during foaming of the liquid foam; said liner including:

a bottom wall;

a top wall spaced from and extending substantially parallel to said bottom wall;

a back wall extending between and disposed substantially perpendicular to said bottom wall and said top wall;

a pair of substantially parallel side walls extending from opposite sides of said back wall between said top wall and said bottom wall and disposed substantially perpendicular to each of said back, top and bottom walls;

a first corner formed by the intersection of said back wall, said top wall and one of said side walls;

a second corner formed by the intersection of said back wall, said top wall and the other of said side walls;

a third corner formed by the intersection of said back wall, said bottom wall and said one of said side walls;

a fourth corner formed by the intersection of said back wall, said bottom wall and said other of said side walls; and each of said corners of said liner being formed free of crinkles with a central portion of slightly convex shape in cross-section relative to the interior of said liner and an outer portion surrounding said central portion and of only concave shape in cross-section relative to the interior of said liner.

2. A refrigerator cabinet according to claim 1 in which said central portion of each of said corners of said liner has a substantially circular outer periphery.

3. A refrigerator cabinet according to claim 2 in which said outer portion of each of said corners is in the form of a generally circular ring extending around said central portion of the corresponding one of said corners.

4. A refrigerator cabinet according to claim 1 in which said liner thickness is in the range of about 0.007 inch to 0.050 inch.

5. A refrigerator cabinet according to claim 2 in which said liner thickness is in the range of about 0.007 inch to 0.050 inch.

* * * * *